No. 661,887. Patented Nov. 13, 1900.
T. H. McCAULEY.
AUTOMATIC TIRE INFLATING DEVICE.
(Application filed Feb. 21, 1900.)
(No Model.)
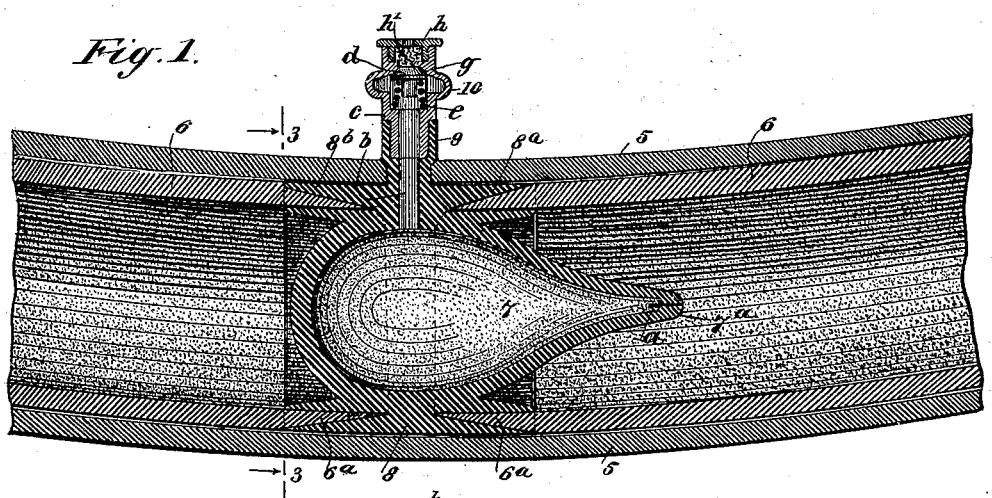
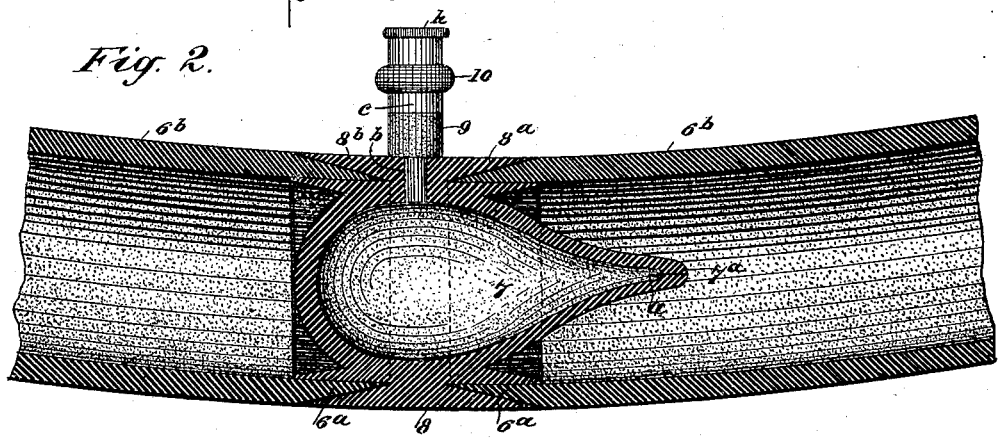
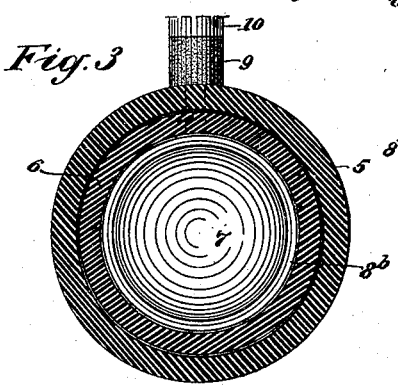
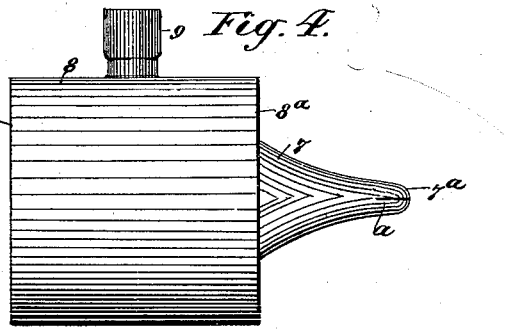
WITNESSES:
INVENTOR
Thomas H. McCauley
BY
ATTORNEYS

UNITED STATES PATENT OFFICE.

THOMAS HENRY McCAULEY, OF PORT ARTHUR, CANADA.

AUTOMATIC TIRE-INFLATING DEVICE.

SPECIFICATION forming part of Letters Patent No. 661,887, dated November 13, 1900.

Application filed February 21, 1900. Serial No. 6,047. (No model.)

*To all whom it may concern:*

Be it known that I, THOMAS HENRY McCAULEY, a subject of the Queen of Great Britain, and a resident of Port Arthur, in the Province of Ontario and Dominion of Canada, have invented an Improved Automatic Tire-Inflating Device, of which the following is a full, clear, and exact description.

This invention relates to means for automatically pumping air into an inflatable tire for a bicycle or other vehicle, and has for its object to provide a simple device of the type indicated which is of novel construction and is adapted to operate very efficiently and be controlled in its operation by the density of air compressed within the tire.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a longitudinal sectional view of a bicycle-tire in part, comprising an inner pneumatic tire and an exterior tube or shoe, showing the improved air-pumping device held within the pneumatic tube and an air-induction valve connected with the pump and outer tube or shoe. Fig. 2 is a longitudinal sectional view of a bicycle-tire in part, comprising a single inflatable tube, showing the improved air-pump secured therein and an air-induction valve engaging the pneumatic tube and pump. Fig. 3 is a transverse sectional view substantially on the line 3 3 in Fig. 1, and Fig. 4 is a side view of the pumping device detached.

In the drawings showing the construction and application of the improvement, 5 indicates the exterior tube of a two-part inflatable tire, which, as usual, is endless, said outer tube being technically known as the "tread" or "shoe" portion of a pneumatic tire. Within the outer tire portion 5 the pneumatic tube 6 is held, which also in complete form is a continuous hollow ring.

Usually the pneumatic tube-ring 6 is provided with a small tubular inlet for the connection of an induction-valve with the inner tube, upon which a hand-pump of any suitable construction is attached and by manipulation of the latter the pneumatic tube is inflated.

The improved air-pumping device comprises a preferably ovate elastic shell 7, having one end thereof somewhat tapered and elongated, terminating in a bulbous nipple which is slit longitudinally, as at $a$, thus providing a self-closing valve $7^a$, which will permit air to pass out of the shell or body 7, but will prevent air from entering the latter through the valve-slit $a$, between the two lips of the valve $7^a$. As shown in Figs. 1 and 2, the concavo-convex end wall of the bulb-shell 7, opposite the end terminating in the lipped valve $7^a$, is made thicker than the tapered portion of the bulb-shell that converges toward said valve for a purpose which will be hereinafter explained. The bulb-shell 7 is proportioned in diameter to the interior diameter of the pneumatic tube 6 and has an internal cubical area sufficient to insure its effective operation in service.

Upon the bulb-shell 7 a cylindrical envelop 8 is formed integral therewith and has such a proportionate length as will afford a circularly-flanged formation at each end thereof, said formations respectively projecting beyond the point of connection with the bulb-shell toward its opposite ends. Each of said formations on the envelop 8 is longitudinally channeled from its edge inward, thus dividing the same, respectively, into two flanges $8^a$ $8^b$. Preferably the groove or channel formed in each circular flange at the ends of the envelop 8 is tapered inwardly, thereby giving an outwardly-tapered form to each flange $8^a$ $8^b$ at each end of the envelop 8. Upon the envelop 8 near its longitudinal center a short elastic tube 9 is integrally formed, and said tube is concentric with a passage $b$, that extends into the cavity of the bulb-shell 7, as shown in Fig. 1.

The tube 9 is designed to afford means for connecting any suitable air-induction valve 10 with the expansible tire and, as shown in Fig. 1, is adapted to envelop the lower end of the body of such a valve and by its constriction hold the valve in place, preventing leakage of air at the point of connection.

The air-induction valve 10, which is shown as one practical means for the supply of air to the novel pumping device, is not claimed to be a new construction, it being one of several forms in common use and essentially comprises a cylindric hollow body $c$, wherein is placed a check-valve $d$, movable inwardly against the pressure of a spring $e$, that normally supports the valve in engagement with the valve-seat $g$.

On the outer end of the valve-body $c$ a perforated cap $h$ is screwed, which may be removed to permit the screwed attachment of a hand-operated air-pump upon the thread of the valve-body, in case such a pump is to be used, which will only be necessary when the tire is first inflated or in case of accident to the automatic pump. The cap-piece $h$ is cupped on the inner side and is preferably filled with wool-sponge $h'$ or other porous material to permit entrance of air, but exclude dust or rain. To connect the automatic pump with the pneumatic tube-ring 6, the latter is severed at one point, and the severed ends $6^a$ are tapered to adapt each end to fit closely into the V-shaped channel in a respective end $8^a$ or $8^b$ of the cylindric envelop 8, as shown.

The ends of the tube-ring 6 are affixed airtight within the annular channels either by cementing them or by vulcanizing the joints, so as to unite the material and render the envelop 8 practically integral with the tube-ring 6.

When the tire consists of an outer tube-ring 5 and a pneumatic tube-ring 6 within the outer tube-ring, the shoe portion of the tire is perforated on the normally inner side thereof for the passage outwardly therethrough of the nipple-tube 9, and there may be a contraction of the diameter of the nipple-tube where said tube has contact with the perforation in the shoe.

The nipple-tube 9 may with advantage be cemented within the perforation of the shoe portion of the tire, which will complete the attachment of the pump to the tire, and it will be seen that the bulb-shell 7 is held by the connection of its integral envelop 8 centrally within the pneumatic tube-ring 6 and longitudinally disposed therein.

The tire having been mounted, as usual, upon the rim of a bicycle-wheel, it is evident that in service the rotating tire on receiving load strain will be somewhat flattened at the point of its contact with the ground if the tube-ring is not fully distended. The bulb-shell 7 will also be compressed when it is brought by the rotation of the bicycle-wheel directly over the point of contact of the tire with the road-bed and will thus sustain the pressure of the load carried by the wheel. The compression of the bulb-shell 7 will hold the check-valve $d$ closely in contact with its seat in the induction-valve body $c$, and air held in the bulb-shell will be partially expelled therefrom through the slit $a$ of the discharging-valve $7^a$. Upon the removal of load strain from the bulb-shell 7 the connection of the envelop 8 with the pneumatic tube-ring 6 will cause said bulb-shell to resume its normal form. This will close the lips of the valve $7^a$ and open the check-valve $d$ for the introduction of air into the bulb-shell 7, and it will be apparent that the peculiar construction of the bulb-shell 7, that affords a thick concave convex end thereon, will facilitate its assumption of normal shape when side pressure is removed from it. Each revolution of the wheel whereon the tire is mounted will cause a repetition of the operation of the air-pumping device, which will quickly pump a maximum amount of air into the pneumatic tube-ring 6 for the dilation of the outer tube-ring or shoe 5, and when the tire yields but slightly to the effects of the load it sustains there will be a cessation of pumping operation until incidental escape of air from the tire again brings the pump into automatic operation.

It will be evident that the connection of the bulb-shell 7 by means of its envelop 8 with the body of the tube-ring 6 adapts the pressure of the air introduced within the tube-ring to positively inforce the resumption of normal shape by the bulb-shell 7, and thus insure the reliable action of the pumping device for supply of air to the tube-ring when the latter is not fully expanded.

The employment of the simple lipped valve $7^a$ is a prime essential for insuring a reliable action by the improved air-pumping device, as a complication of parts in a valve that is not accessible for repair would soon render the pump inoperative and worthless.

I am aware that bulbs have already been tried as pumping devices for the inflation of pneumatic tires; but such bulbs were not arranged to be positively dilated after compression by the expansion of the pneumatic tube-ring in which they were placed. Hence they failed to operate when the tire was partially expanded, as the pressure of the compressed air in the tire-tube pressed upon the bulb so as to prevent its resumption of normal form.

In Fig. 2 I have shown the improved air-pumping device applied for the expansion of a single-tube pneumatic tire $6^b$ or one where the shoe is dispensed with, the construction and application of the bulb-shell 7 and its envelop 8 being similar to that shown in Fig. 1, and the tube 9 should be an integral portion of the envelop 8 in this form of tire. The operation of the pump for the dilation of the tubular tire $6^a$ is identical with that already described.

I have specified that the tube-ring 6 or $6^a$ is formed endless, and subsequently severed to provide ends for the connection with the channeled ends of the envelop 8; but it is to be understood that these rings may be formed originally with ends which are beveled at their edges to be properly inserted and affixed within the annular V-shaped channels in the ends of the flanges on the envelop 8. Furthermore, the outer casing or shoe portion 5 may be in the form of an open jacket adapted to be applied and secured upon the pneumatic tube-ring by the use of lacings; but as this is not a feature of my invention it is not shown in the drawings.

Having thus described my invention, I claim as new and desire to secure by Letters Patent—

1. A pumping device for pneumatic tires, comprising a bulb-shell having an air-discharge valve, and an envelop integral with the bulb-shell and having annular grooves in its ends to receive the ends of the tire.

2. A pumping device for pneumatic tires, comprising an elastic bulb-shell provided with an integral cylindrical envelop adapted to be inserted between the ends of the tire, and having its ends arranged for permanent attachment to the ends of the tire, the said bulb-shell tapering at one end and terminating at said end in an integral lipped valve, the wall of the other end of said bulb-shell being thicker than the tapered portion, the said thick end serving to facilitate the return of the bulb-shell to normal shape after compression.

3. A pumping device for pneumatic tires, comprising a bulb-shell, an air-discharge valve at one end of the shell, a laterally-flanged cylindrical envelop on the bulb-shell and having channels in the ends of its flanges to receive the ends of the pneumatic tube, and an elastic tube on the envelop and concentric with a passage extending into the cavity of the bulb-shell.

4. A pumping device for pneumatic tires, comprising an ovate bulb-shell, a lipped valve integrally formed at one end of the bulb-shell, a laterally-flanged envelop integral with the bulb-shell, and having annular grooves in the ends of its flanges to receive the ends of a severed tube-ring, which ends are secured in said grooves.

5. A pumping device for pneumatic tires, comprising an ovate bulb-shell, a lipped valve integrally formed at one end of the bulb-shell, a laterally-flanged envelop integral with the bulb-shell and having a V-shaped channel in the end of each flange to receive the tapered ends of a pneumatic tube, which ends are secured in said channels to form an endless tube-ring, and means to induct air into the bulb-shell through a perforation in said shell.

6. The combination with an outer shoe, and an inner pneumatic tube comprising an inflatable tire, of a pumping device located in the pneumatic tube, comprising an ovate bulb-shell, a double-lipped valve integrally formed at one end of the bulb-shell, a laterally-flanged envelop integral with the bulb-shell, and having a V-shaped channel in the end of each flange to receive the tapered ends of the pneumatic tube, which ends are secured in said channels to form an endless tube-ring, a tubular nipple extending outwardly from the envelop over a perforation in said envelop and in the shell of the tube-ring, and an air-induction valve engaging the tubular nipple, the inlet portion of said valve having a porous filling.

7. A pumping device for pneumatic tires, comprising a substantially ovate-shaped bulb-shell having a thick concavo-convex end wall, a tapered thinner body portion, a two-lipped valve at the end of said tapering body portion, and a cylindric envelop on the bulb-shell adapted to have its ends connected with the ends of a severed tube-ring.

8. The combination with a pneumatic tube, of a pumping device located within the tube at the ends thereof, the said pumping device comprising a bulb-shell having an air-inlet and an air-outlet, and an envelop on the bulb-shell having projecting ends for connection with the ends of the tire, the ends of one of said parts being provided with annular grooves, and the ends of the other part being fitted and held within said grooves.

In testimony whereof I have signed my name to this specification in the presence of two subscribing witnesses.

THOMAS HENRY McCAULEY.

Witnesses:
W. McBRADY,
ARTHUR E. ROBERTS.